US012756013B2

(12) United States Patent
Yoshimura

(10) Patent No.: US 12,756,013 B2

(45) Date of Patent: Oct. 6, 2026

(54) ELECTROLYTIC SOLUTION FOR SECONDARY BATTERY, AND SECONDARY BATTERY

(71) Applicant: MURATA MANUFACTURING CO., LTD., Kyoto (JP)

(72) Inventor: Kentaro Yoshimura, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 497 days.

(21) Appl. No.: 18/226,943

(22) Filed: Jul. 27, 2023

(65) Prior Publication Data

US 2023/0369648 A1 Nov. 16, 2023

Related U.S. Application Data

(63) Continuation of application No. PCT/JP2021/044940, filed on Dec. 7, 2021.

(30) Foreign Application Priority Data

Jan. 27, 2021 (JP) ................................ 2021-011473

(51) Int. Cl.

*H01M 10/0567* (2010.01)
*H01M 10/0525* (2010.01)
*H01M 10/0569* (2010.01)

(52) U.S. Cl.

CPC ... *H01M 10/0567* (2013.01); *H01M 10/0525* (2013.01); *H01M 10/0569* (2013.01); *H01M 2300/0028* (2013.01)

(58) Field of Classification Search

None

See application file for complete search history.

(56) References Cited

U.S. PATENT DOCUMENTS

| | | | | |
|---|---|---|---|---|
| 2015/0132639 | A1* | 5/2015 | Kodama | H01M 10/0567 429/188 |
| 2017/0352920 | A1 | 12/2017 | Kawai et al. | |
| 2021/0242501 | A1* | 8/2021 | Sakamoto | H01M 10/0569 |

FOREIGN PATENT DOCUMENTS

| | | | |
|---|---|---|---|
| CN | 104205470 | A | 12/2014 |
| JP | 2002042869 | A | 2/2002 |
| JP | 4858741 | B2 | 1/2012 |
| JP | 2015138707 | A | 7/2015 |
| JP | 2019200880 | A | 11/2019 |
| WO | 2016063468 | A1 | 4/2016 |
| WO | 2020065834 | A1 | 4/2020 |

OTHER PUBLICATIONS

International Search Report of corresponding PCT application PCT/JP2021/044940, dated Jan. 18, 2022.

(Continued)

*Primary Examiner* — Wyatt P Mcconnell

(74) *Attorney, Agent, or Firm* — K&L Gates LLP

(57) ABSTRACT

A secondary battery includes a positive electrode, a negative electrode, and an electrolytic solution. The electrolytic solution includes a reactive cyclic carbonic acid ester compound and an anthraquinone compound. The reactive cyclic carbonic acid ester compound includes at least one of an unsaturated cyclic carbonic acid ester, a fluorinated cyclic carbonic acid ester, or a cyanated cyclic carbonic acid ester. The anthraquinone compound is represented by Formula (1).

10 Claims, 2 Drawing Sheets

(56) References Cited

OTHER PUBLICATIONS

Office Action issued for corresponding Chinese Patent Application No. 202180092092.9, dated Mar. 19, 2026. (5 pages.).
Search Report issued for corresponding Chinese Patent Application No. 202180092092.9, dated Mar. 17, 2026. (2 pages.).
Office Action issued in related Chinese Patent Application No. 202180092092.9 dated Aug. 20, 2026. 5 pages.

* cited by examiner

ELECTROLYTIC SOLUTION FOR SECONDARY BATTERY, AND SECONDARY BATTERY

CROSS REFERENCE TO RELATED APPLICATIONS

The present application is a continuation of PCT patent application no. PCT/JP2021/044940, filed on Dec. 7, 2021, which claims priority to Japanese patent application no. 2021-011473, filed on Jan. 27, 2021, the entire contents of which are incorporated herein by reference.

BACKGROUND

The present technology relates to an electrolytic solution for a secondary battery, and a secondary battery.

Various kinds of electronic equipment, including mobile phones, have been widely used. Such widespread use has promoted development of a secondary battery as a power source that is smaller in size and lighter in weight and has a higher energy density. The secondary battery includes a positive electrode, a negative electrode, and an electrolytic solution (an electrolytic solution for a secondary battery). For example, a configuration of the secondary battery has been considered in various ways.

Specifically, to obtain a polymer electrolyte varnish for an electrochemical device having a superior ion conductivity, a polymerizable compound having one or more ethylenically unsaturated bond in each molecule is added to a polymer solution synthesized in an electrolytic solution organic solvent, thereby forming an electrolyte film using a cross-linking reaction of the polymerizable compound. To obtain an ion-conductive gel electrolyte for an electrochemical device having, for example, a high mechanical strength, the ion-conductive gel electrolyte includes a polymerizable compound having one or more ethylenically unsaturated bond in each molecule. To reduce resistance of an electrode-electrolyte interface in a lithium secondary battery, a lithium ion-conductive electrolyte includes an organic compound such as anthraquinone.

SUMMARY

The present technology relates to an electrolytic solution for a secondary battery, and a secondary battery.

Although consideration has been given in various ways regarding a battery characteristic of a secondary battery, a cyclability characteristic of the secondary battery is not sufficient yet. Accordingly, there is room for improvement in terms thereof.

It is therefore desirable to provide an electrolytic solution for a secondary battery and a secondary battery each of which makes it possible to achieve a superior cyclability characteristic.

An electrolytic solution for a secondary battery according to an embodiment of the present technology includes a reactive cyclic carbonic acid ester compound and an anthraquinone compound. The reactive cyclic carbonic acid ester compound includes at least one of an unsaturated cyclic carbonic acid ester, a fluorinated cyclic carbonic acid ester, or a cyanated cyclic carbonic acid ester. The anthraquinone compound is represented by Formula (1).

(1)

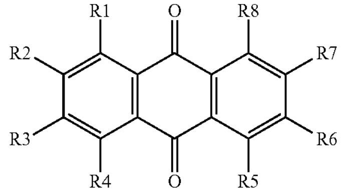

where:

each of R1 to R8 is one of hydrogen (H), an alkyl group, an alkenyl group, an aryl group, or an acid metal salt group; and any two or more of R1 to R8 are optionally bonded to each other.

A secondary battery according to an embodiment of the present technology includes a positive electrode, a negative electrode, and an electrolytic solution. The electrolytic solution has a configuration similar to the configuration of the electrolytic solution for a secondary battery according to an embodiment of the present technology.

Details (definitions) of each of the reactive cyclic carbonic acid ester compound (the unsaturated cyclic carbonic acid ester, the fluorinated cyclic carbonic acid ester, and the cyanated cyclic carbonic acid ester), the anthraquinone compound, and the acid metal salt group will be described later according to an embodiment.

According to the electrolytic solution for a secondary battery or the secondary battery of an embodiment of the present technology, the electrolytic solution for a secondary battery includes the reactive cyclic carbonic acid ester compound and the anthraquinone compound. Accordingly, it is possible to achieve a superior cyclability characteristic.

Note that effects of the present technology are not necessarily limited to those described herein and may include any of a series of effects described below in relation to the present technology.

DETAILED DESCRIPTION

Figure 1:
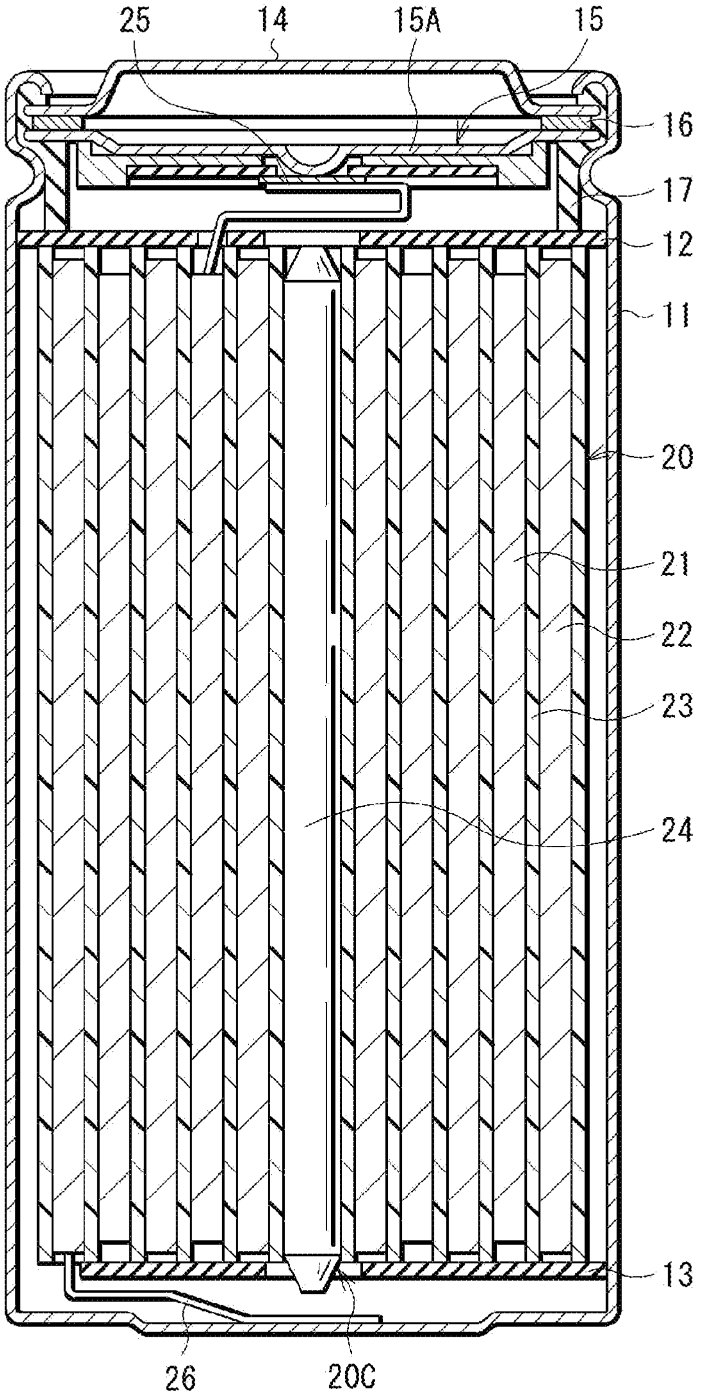
FIG. 1 is a sectional view of a configuration of a secondary battery according to an embodiment of the present technology.

One or more embodiments of the present technology are described below in further detail including with reference to the drawings.

A description is given first of an electrolytic solution for a secondary battery (hereinafter simply referred to as an "electrolytic solution") according to an embodiment of the present technology.

The electrolytic solution is to be used in a secondary battery, which is an electrochemical device. However, the electrolytic solution may be used in electrochemical devices other than a secondary battery. Other electrochemical devices are not particularly limited in kind, and specific examples thereof include a capacitor.

The electrolytic solution includes a reactive cyclic carbonic acid ester compound and an anthraquinone compound represented by Formula (1).

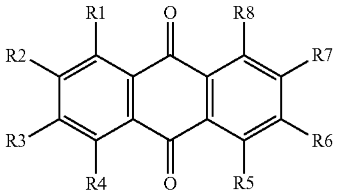

(1)

where:

each of R1 to R8 is one of hydrogen, an alkyl group, an alkenyl group, an aryl group, or an acid metal salt group; and any two or more of R1 to R8 are optionally bonded to each other.

A reason why the electrolytic solution includes the reactive cyclic carbonic acid ester compound and the anthraquinone compound together is that a robust film is formed on a surface of an electrode during charging and discharging of the secondary battery including the electrolytic solution compared with a case where the electrolytic solution includes only one of the reactive cyclic carbonic acid ester compound or the anthraquinone compound. The term "electrode" is a positive electrode 21, a negative electrode 22, or both. The positive electrode 21 and the negative electrode 22 are to be described later. The formation of the robust film suppresses a decomposition reaction of the electrolytic solution on the surface of the electrode(s) that is reactive upon charging and discharging. This reduces a decrease in a discharge capacity even upon repeated charging and discharging. Details of the reason described here will be described later according to an embodiment.

The term "reactive cyclic carbonic acid ester compound" is a general term for a cyclic carbonic acid ester having reactivity. More specifically, the reactive cyclic carbonic acid ester compound includes one or more of the unsaturated cyclic carbonic acid ester, the fluorinated cyclic carbonic acid ester, or the cyanated cyclic carbonic acid ester.

Only one unsaturated cyclic carbonic acid ester may be used, and two or more unsaturated cyclic carbonic acid esters may be used. In a similar manner, only one fluorinated cyclic carbonic acid ester may be used, and two or more fluorinated cyclic carbonic acid esters may be used. Only one cyanated cyclic carbonic acid ester may be used, and two or more cyanated cyclic carbonic acid esters may be used.

The unsaturated cyclic carbonic acid ester is a cyclic carbonic acid ester having an unsaturated carbon bond (a carbon-carbon double bond). The number of unsaturated carbon bonds is not particularly limited and may be only one, or two or more.

The unsaturated cyclic carbonic acid ester includes one or more of a vinylene-carbonate-based compound, a vinylethylene-carbonate-based compound, or a methylene-ethylene-carbonate-based compound.

The vinylene-carbonate-based compound is an unsaturated cyclic carbonic acid ester having a configuration of a vinylene carbonate type. Specific examples of the vinylene-carbonate-based compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, diethyl-1,3-dioxol-2-one, 4-fluoro-1,3-dioxol-2-one, and 4-trifluoromethyl-1,3-dioxol-2-one.

The vinyl-ethylene-carbonate-based compound is an unsaturated cyclic carbonic acid ester having a configuration of a vinyl ethylene carbonate type. Specific examples of the vinyl-ethylene-carbonate-based compound include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one.

The methylene-ethylene-carbonate-based compound is an unsaturated cyclic carbonic acid ester having a configuration of a methylene ethylene carbonate type. Specific examples of the methylene-ethylene-carbonate-based compound include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one. Here, a compound having only one methylene group is given as an example of the methylene-ethylene-carbonate-based compound, but the methylene-ethylene-carbonate-based compound may include two or more methylene groups.

Note that the cyclic carbonic acid ester having an unsaturated carbon bond belongs to neither the fluorinated cyclic carbonic acid ester nor the cyanated cyclic carbonic acid ester, but belongs to the unsaturated cyclic carbonic acid ester.

The fluorinated cyclic carbonic acid ester is a cyclic carbonic acid ester including fluorine as a constituent element. The number of fluorines is not particularly limited and may be only one, or two or more. That is, the fluorinated cyclic carbonic acid ester is a compound resulting from substituting one or more hydrogens of a cyclic carbonic acid ester with one or more fluorines.

Specific examples of the fluorinated cyclic carbonic acid ester include fluoroethylene carbonate (4-fluoro-1,3-dioxolane-2-one) and difluoroethylene carbonate (4,5-difluoro-1,3-dioxolane-2-one).

Note that the cyclic carbonic acid ester including fluorine as a constituent element belongs to neither the unsaturated cyclic carbonic acid ester nor the cyanated cyclic carbonic acid ester, but belongs to the fluorinated cyclic carbonic acid ester.

The cyanated cyclic carbonic acid ester is a cyclic carbonic acid ester having a cyano group. The number of cyano groups is not particularly limited and may be only one, or two or more. That is, the cyanated cyclic carbonic acid ester is a compound resulting from substituting one or more hydrogen atoms of a cyclic carbonic acid ester with one or more cyano groups.

Specific examples of the cyanated cyclic carbonic acid ester include cyanoethylene carbonate (4-cyano-1,3-dioxolane-2-one) and dicyanoethylene carbonate (4,5-dicyano-1,3-dioxolane-2-one).

Note that the cyclic carbonic acid ester having a cyano group belongs to neither the unsaturated cyclic carbonic acid ester nor the fluorinated cyclic carbonic acid ester, but belongs to the cyanated cyclic carbonic acid ester.

A content of the reactive cyclic carbonic acid ester compound in the electrolytic solution is not particularly limited, and in particular, the content is preferably within a range from 0.5 wt % to 10 wt % both inclusive. A reason for this is that a sufficiently robust film is more easily formed on the surface of the electrode.

The content of the reactive cyclic carbonic acid ester compound described here is the sum of a content of the unsaturated cyclic carbonic acid ester, a content of the fluorinated cyclic carbonic acid ester, and a content of the cyanated cyclic carbonic acid ester.

That is, for example, the content of the reactive cyclic carbonic acid ester compound is as follows. When the reactive cyclic carbonic acid ester compound includes only the unsaturated cyclic carbonic acid ester, the content of the reactive cyclic carbonic acid ester compound is the content of the unsaturated cyclic carbonic acid ester. When the reactive cyclic carbonic acid ester compound includes only the unsaturated cyclic carbonic acid ester and the fluorinated cyclic carbonic acid ester, the content of the reactive cyclic carbonic acid ester compound is the sum of the content of the unsaturated cyclic carbonic acid ester and the content of the fluorinated cyclic carbonic acid ester. When the reactive cyclic carbonic acid ester compound includes all the unsaturated cyclic carbonic acid ester, the fluorinated cyclic carbonic acid ester, and the cyanated cyclic carbonic acid ester, the content of the reactive cyclic carbonic acid ester compound is the sum of the content of the unsaturated cyclic carbonic acid ester, the content of the fluorinated cyclic carbonic acid ester, and the content of the cyanated cyclic carbonic acid ester.

The anthraquinone compound is one of anthraquinone or anthraquinone derivatives as represented by Formula (1). Note that only one anthraquinone compound may be used, and two or more anthraquinone compounds may be used.

Each of R1 to R8 is not particularly limited as long as each of R1 to R8 is one of hydrogen, an alkyl group, an alkenyl group, an aryl group, or an acid metal salt group as described above.

Carbon number of the alkyl group is not particularly limited. The alkyl group may have: a straight-chain structure; or a branched structure having one or more side chains. Specific examples of the alkyl group include a methyl group, an ethyl group, a propyl group, and a butyl group.

Carbon number of the alkenyl group is not particularly limited. The alkenyl group may have a straight-chain structure or a branched structure. Specific examples of the alkenyl group include a vinyl group and an allyl group.

Carbon number of the aryl group is not particularly limited. Specific examples of the aryl group include a phenyl group and a naphthyl group.

The acid metal salt group is a metal salt of acid having a structure that allows for carbon bonding derived from substitution of one of hydrogens of a hydrocarbon forming a backbone. The acid is not particularly limited in kind, and specific examples thereof include sulfonic acid, sulfamic acid, and carboxylic acid. The metal salt is not particularly limited in kind, and specific examples thereof include an alkali metal salt such as a lithium salt, a sodium salt, or a potassium salt. That is, the acid metal salt group is not particularly limited in kind, and specific examples thereof include a sulfonic acid alkali metal salt group, a sulfamic acid alkali metal salt group, and a carboxylic acid alkali metal salt group.

Specific examples of the sulfonic acid alkali metal salt group include a sulfuric acid lithium salt group ($—SO_3Li$), a sulfuric acid sodium salt group ($—SO_3Na$), and a sulfuric acid potassium salt group ($—SO_3K$). Specific examples of the sulfamic acid alkali metal salt group include a sulfamic acid lithium salt group ($—NHSO_3Li$), a sulfamic acid sodium salt group ($—NHSO_3Na$), and a sulfamic acid potassium salt group ($—NHSO_3K$). Specific examples of the carboxylic acid alkali metal salt group include a carboxylic acid lithium salt group ($—CO_2Li$), a carboxylic acid sodium salt group ($—CO_2Na$), and a carboxylic acid potassium salt group ($—CO_2K$).

In particular, the acid metal salt group preferably includes the sulfonic acid alkali metal salt group. A reason for this is that a sufficiently robust film is more easily formed on the surface of the electrode.

In particular, one or more of R1 to R8 are each preferably an electron donating group. That is, one or more of R1 to R8 are each preferably one of an alkyl group, an alkenyl group, an aryl group, or an acid metal salt group described above. A reason for this is that because the anthraquinone compound is more easily dispersed or dissolved in the electrolytic solution, a more robust film is more easily formed on the surface of the electrode.

Specific examples of the anthraquinone compound include anthraquinone, 2-methylanthraquinone, 2,3-dimethylanthraquinone, 2-ethylanthraquinone, 2-tert-butylanthraquinone, 2-vinylanthraquinone, 2-phenylanthraquinone, 1,2-benzanthraquinone, and dipotassium anthraquinone-1,8-disulfonate.

A content of the anthraquinone compound in the electrolytic solution is not particularly limited, and in particular, the content is preferably within a range from 0.01 wt % to 1 wt % both inclusive. A reason for this is that a sufficiently robust film is formed on the surface of the electrode.

Note that the electrolytic solution may further include a solvent. The solvent includes one or more of non-aqueous solvents (organic solvents), and the electrolytic solution including the non-aqueous solvent(s) is what is called a non-aqueous electrolytic solution. The non-aqueous solvent is, for example, an ester or an ether, more specifically, a carbonic-acid-ester-based compound, a carboxylic-acid-ester-based compound, or a lactone-based compound, for example.

The carbonic-acid-ester-based compound is, for example, a cyclic carbonic acid ester or a chain carbonic acid ester. Specific examples of the cyclic carbonic acid ester include ethylene carbonate and propylene carbonate. Specific examples of the chain carbonic acid ester include dimethyl carbonate, diethyl carbonate, and ethyl methyl carbonate.

The carboxylic-acid-ester-based compound is a chain carboxylic acid ester, for example. Specific examples of the chain carboxylic acid ester include methyl acetate, ethyl acetate, methyl propionate, ethyl propionate, propyl propionate, and ethyl trimethylacetate.

The lactone-based compound is a lactone, for example. Specific examples of the lactone include γ-butyrolactone and γ-valerolactone.

Note that the ether may be the lactone-based compound described above, 1,2-dimethoxyethane, tetrahydrofuran, 1,3-dioxolane, or 1,4-dioxane, for example.

It is preferable that the non-aqueous solvent include a high-dielectric-constant solvent having a specific dielectric constant of greater than or equal to 20 at a temperature within a range of higher than or equal to −30° C. and lower than 60° C. A reason for this is that a high battery capacity is obtainable in the secondary battery including the electrolytic solution. The high-dielectric-constant solvent is a cyclic compound such as the cyclic carbonic acid ester or the lactone described above. Note that a chain compound such as the chain carbonic acid ester or the chain carboxylic acid ester described above is a low-dielectric-constant solvent having a specific dielectric constant that is smaller than that of the high-dielectric-constant solvent.

In particular, it is preferable that the high-dielectric-constant solvent include the lactone, and a proportion R of a weight W2 of the lactone to a weight W1 of the high-dielectric-constant solvent be within a range from 30 wt % to 100 wt % both inclusive. A reason for this is that this reduces a decrease in the discharge capacity and generation of gas due to the decomposition reaction of the electrolytic solution even when the secondary battery including the electrolytic solution is charged and discharged. The proportion R is calculated based on the following calculation expression: proportion R (wt %)=(W2/W1)×100.

Note that the electrolytic solution may further include an electrolyte salt. The electrolyte salt is a light metal salt such as a lithium salt. Specific examples of the lithium salt include lithium hexafluorophosphate ($LiPF_6$), lithium tetrafluoroborate ($LiBF_4$), lithium trifluoromethanesulfonate ($LiCF_3SO_3$), bis(fluorosulfonyl)imide lithium ($LiN(FSO_2)_2$), bis(trifluoromethanesulfonyl)imide lithium ($LiN(CF_3SO_2)_2$), lithium tris(trifluoromethanesulfonyl)methide ($LiC(CF_3SO_2)_3$), and bis(oxalato) lithium borate ($LiB(C_2O_4)_2$).

A content of the electrolyte salt is not particularly limited and is specifically within a range from 0.3 mol/kg to 3.0 mol/kg both inclusive with respect to the solvent. A reason for this is that high ion conductivity is obtainable.

Note that the electrolytic solution may further include one or more of additives.

Specifically, the additive includes one or more of a sulfonic acid ester, a sulfuric acid ester, a sulfurous acid ester, a dicarboxylic acid anhydride, a disulfonic acid anhydride, or a sulfonic acid carboxylic acid anhydride. This suppresses the decomposition reaction of the electrolytic solution in the secondary battery including the electrolytic solution.

A content of the sulfonic acid ester in the electrolytic solution is not particularly limited and may be set as desired. In a similar manner, a content of each of a sulfuric acid ester, a sulfurous acid ester, a dicarboxylic acid anhydride, a disulfonic acid anhydride, and a sulfonic acid carboxylic acid anhydride may be set as desired.

Specific examples of the sulfonic acid ester include 1,3-propane sultone, 1-propene-1,3-sultone, 1,4-butane sultone, 2,4-butane sultone, and methanesulfonic acid propargyl ester.

Specific examples of the sulfuric acid ester include 1,3,2-dioxathiolane 2,2-dioxide, 1,3,2-dioxathiane 2,2-dioxide, and 4-methylsulfonyloxymethyl-2,2-dioxo-1,3,2-dioxathiolane.

Specific examples of the sulfurous acid ester include 1,3-propane sultone, 1-propene-1,3-sultone, 1,4-butane sultone, 2,4-butane sultone, and methanesulfonic acid propargyl ester. Specific examples of the sulfurous acid ester include 1,3,2-dioxathiolane 2-oxide and 4-methyl-1,3,2-dioxathiolane 2-oxide.

Specific examples of the dicarboxylic acid anhydride include 1,4-dioxane-2,6-dione, succinic anhydride, and glutaric anhydride.

Specific examples of the disulfonic acid anhydride include 1,2-ethanedisulfonic anhydride, 1,3-propanedisulfonic anhydride, and hexafluoro 1,3-propanedisulfonic anhydride.

Specific examples of the sulfonic acid carboxylic acid anhydride include 2-sulfobenzoic anhydride and 2,2-dioxooxathiolane-5-one.

Further, the additive is a nitrile compound. A reason for this is that this reduces a decrease in the discharge capacity and generation of gas due to the decomposition reaction of the electrolytic solution even when the secondary battery including the electrolytic solution is repeatedly charged and discharged. A content of the nitrile compound in the electrolytic solution is not particularly limited and may be set as desired.

The nitrile compound is a compound having one or more cyano groups (—CN). Specific examples of the nitrile compound include octanenitrile, benzonitrile, phthalonitrile, succinonitrile, glutaronitrile, adiponitrile, cebaconitrile, 1,3,6-hexanetricarbonitrile, 3,3'-oxydipropionitrile, 3-butoxypropionitrile, ethylene glycol bispropionitrile ether, 1,2,2,3-tetracyanopropane, tetracyanopropane, fumaronitrile, 7,7,8,8-tetracyanoquinodimethane, cyclopentanecarbonitrile, 1,3,5-cyclohexanetricarbonitrile, and 1,3-bis(dicyanomethylidene)indane.

Note that the cyanated cyclic carbonic acid ester described above is excluded from the nitrile compound described here.

In a case of manufacturing the electrolytic solution, the electrolyte salt is added to the solvent, following which the reactive cyclic carbonic acid ester compound and the anthraquinone are added to the solvent. The electrolyte salt, the reactive cyclic carbonic acid ester compound, and the anthraquinone are thereby each dispersed or dissolved in the solvent. As a result, the electrolytic solution is prepared.

The electrolytic solution includes the reactive cyclic carbonic acid ester compound and the anthraquinone together.

In this case, a robust film is formed on the surface of the electrode in the secondary battery including the electrolytic solution upon charging and discharging compared with the case where the electrolytic solution includes only one of the reactive cyclic carbonic acid ester compound or the anthraquinone compound, as described above.

Specifically, during charging and discharging of the secondary battery, owing to synergistic interaction between the reactive cyclic carbonic acid ester compound and the anthraquinone, a film derived from both of the reactive cyclic carbonic acid ester compound and the anthraquinone is formed on the surface of the electrode, and the electrochemical strength of the film is markedly improved. In this case, the film is formed by a reaction between the reactive cyclic carbonic acid ester compound and the anthraquinone even when the electrolytic solution does not include a photopolymerization initiator or a thermal polymerization initiator. Thus, the surface of the electrode is protected by the film, and the film is more easily retained even when charging and discharging are repeated. Accordingly, the decomposition reaction of the electrolytic solution is suppressed on the surface of the electrode having reactivity. This reduces a decrease in the discharge capacity even when charging and discharging of the secondary battery are repeated, and it is thus possible to achieve a superior cyclability characteristic in the secondary battery including the electrolytic solution.

In particular, the acid metal salt group may be a sulfonic acid alkali metal salt group. This makes it easier for a sufficiently robust film to be formed on the surface of the electrode. Accordingly, it is possible to achieve higher effects.

One or more of R1 to R8 in Formula (1) regarding the anthraquinone compound may each be an electron donating group. This makes it easier for a sufficiently robust film to be formed on the surface of the electrode. Accordingly, it is possible to achieve higher effects.

The content of the reactive cyclic carbonic acid ester compound in the electrolytic solution may be within the range from 0.5 wt % to 10 wt % both inclusive, and the content of the anthraquinone compound in the electrolytic solution may be within the range from 0.01 wt % to 1 wt % both inclusive. This makes it easier for a sufficiently robust film to be formed on the surface of the electrode. Accordingly, it is possible to achieve higher effects.

The electrolytic solution may include the high-dielectric-constant solvent including the lactone, and the proportion R may be within the range from 30 wt % to 100 wt % both inclusive. This suppresses the generation of gas due to the decomposition reaction of the electrolytic solution while the discharge capacity is secured even when the secondary battery is repeatedly charged and discharged. This improves safety while securing the cyclability characteristic. Accordingly, it is possible to achieve higher effects.

In addition, the electrolytic solution may include one or more of the sulfonic acid ester, the sulfuric acid ester, the sulfurous acid ester, the dicarboxylic acid anhydride, the disulfonic acid anhydride, or the sulfonic acid carboxylic acid anhydride. This further suppresses the decomposition reaction of the electrolytic solution even when the secondary battery is repeatedly charged and discharged. Accordingly, it is possible to achieve higher effects.

The electrolytic solution may include the nitrile compound. This suppresses the generation of gas due to the decomposition reaction of the electrolytic solution while the discharge capacity is secured even when the secondary battery is repeatedly charged and discharged. This improves safety while securing the cyclability characteristic. Accordingly, it is possible to achieve higher effects.

A description is given next of a secondary battery including the electrolytic solution described above.

The secondary battery to be described here is a secondary battery that obtains a battery capacity using insertion and extraction of an electrode reactant, and includes a positive electrode, a negative electrode, and an electrolytic solution. The electrolytic solution is a liquid electrolyte.

In the secondary battery, a charge capacity of the negative electrode is greater than a discharge capacity of the positive electrode. In other words, an electrochemical capacity per unit area of the negative electrode is set to be greater than an electrochemical capacity per unit area of the positive electrode. This is to prevent precipitation of the electrode reactant on a surface of the negative electrode during charging.

The electrode reactant is not particularly limited in kind, and specific examples thereof include a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is what is called a lithium-ion secondary battery. In the lithium-ion secondary battery, lithium is inserted and extracted in an ionic state.

Figure 2:
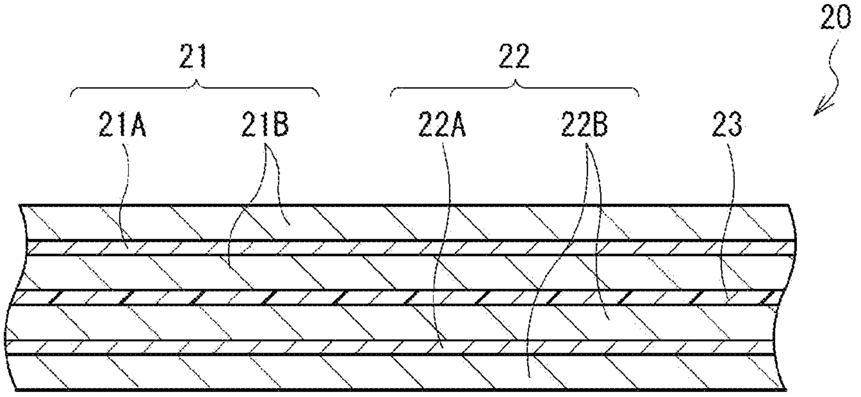
FIG. 2 is a sectional view of a configuration of a battery device illustrated in FIG. 1.

FIG. 1 illustrates a sectional configuration of the secondary battery. FIG. 2 illustrates a sectional configuration of a battery device 20 illustrated in FIG. 1. Note that FIG. 2 illustrates only a portion of the battery device 20.

As illustrated in FIGS. 1 and 2, the secondary battery includes a battery can 11, a pair of insulating plates 12 and 13, the battery device 20, a positive electrode lead 25, and a negative electrode lead 26. The secondary battery to be described here is a secondary battery of a cylindrical type. The secondary battery of the cylindrical type includes the battery can 11 having a cylindrical shape that contains the battery device 20.

As illustrated in FIG. 1, the battery can 11 is a container member that contains, for example, the battery device 20. The battery can 11 has a hollow structure with a closed end part and an open end part, and includes one or more of metal materials including, without limitation, iron, aluminum, an iron alloy, and an aluminum alloy. The battery can 11 has a surface that may be plated with a metal material such as nickel.

The insulating plates 12 and 13 are disposed in such a manner as to be opposed to each other with the battery device 20 interposed therebetween. Thus, the battery device 20 is sandwiched between the insulating plates 12 and 13.

A battery cover 14, a safety valve mechanism 15, and a thermosensitive resistive device (PTC device) 16 are crimped to the battery can 11 at the open end part by means of a gasket 17. The open end part of the battery can 11 is thereby sealed by the battery cover 14. Here, the battery cover 14 includes a material similar to the material included in the battery can 11. The safety valve mechanism 15 and the PTC device 16 are each disposed on an inner side of the battery cover 14. The safety valve mechanism 15 is electrically coupled to the battery cover 14 with the PTC device 16 interposed therebetween. The gasket 17 includes an insulating material and has a surface on which a material such as asphalt may be applied.

In the safety valve mechanism 15, a disk plate 15A inverts when an internal pressure of the battery can 11 reaches a certain level or higher due to an event such as an internal short-circuit or heating, thereby cutting off the electrical coupling between the battery cover 14 and the battery device 20. The PTC device 16 involves an increase in electric resistance in accordance with a rise in temperature, in order to prevent abnormal heat generation resulting from a large current.

As illustrated in FIGS. 1 and 2, the battery device 20 is a power generation device that includes the positive electrode 21, the negative electrode 22, a separator 23, and the electrolytic solution (not illustrated).

The battery device 20 is what is called a wound electrode body. That is, in the battery device 20, the positive electrode 21 and the negative electrode 22 are stacked on each other with the separator 23 interposed therebetween, and the stack of the positive electrode 21, the negative electrode 22, and the separator 23 is wound. Thus, the positive electrode 21 and the negative electrode 22 are opposed to each other with the separator 23 interposed therebetween, and are wound. A center pin 24 is disposed in a winding space 20C of the battery device 20. The winding space 20C is disposed in a winding center of the battery device 20. Note, however, that the center pin 24 may be omitted.

The positive electrode 21 includes, as illustrated in FIG. 2, a positive electrode current collector 21A and a positive electrode active material layer 21B.

The positive electrode current collector 21A has two opposed surfaces on each of which the positive electrode active material layer 21B is to be provided. The positive electrode current collector 21A includes an electrically conductive material such as a metal material. Examples of the metal material include aluminum.

Here, the positive electrode active material layer 21B is provided on each of the two opposed surfaces of the positive electrode current collector 21A. The positive electrode active material layer 21B includes one or more of positive electrode active materials into which lithium is insertable and from which lithium is extractable. Note that the positive electrode active material layer 21B may be provided only on one of the two opposed surfaces of the positive electrode current collector 21A on a side where the positive electrode 21 is opposed to the negative electrode 22. Further, the positive electrode active material layer 21B may further include one or more of other materials including, without limitation, a positive electrode binder and a positive electrode conductor. A method of forming the positive electrode active material layer 21B is not particularly limited and specifically includes one or more of methods including, without limitation, a coating method.

The positive electrode active material is not particularly limited in kind, and specific examples thereof include a lithium-containing compound. The lithium-containing compound is a compound that includes lithium and one or more transition metal elements as one or more constituent elements. The lithium-containing compound may further include one or more other elements as one or more constituent elements. The one or more other elements are not particularly limited in kind as long as the one or more other elements are each an element other than lithium and the transition metal elements. Specifically, the one or more other elements are any one or more of elements belonging to groups 2 to 15 in the long period periodic table of elements. The lithium-containing compound is not particularly limited in kind, and is specifically an oxide, a phosphoric acid compound, a silicic acid compound, or a boric acid compound, for example.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, and $LiMn_2O_4$. Specific examples of the phosphoric acid compound include $LiFePO_4$, $LiMnPO_4$, and $LiFe_{0.5}Mn_{0.5}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. Note that the electrically conductive material may be a metal material or a polymer compound, for example.

As illustrated in FIG. 2, the negative electrode 22 includes a negative electrode current collector 22A and a negative electrode active material layer 22B.

The negative electrode current collector 22A has two opposed surfaces on each of which the negative electrode active material layer 22B is to be provided. The negative electrode current collector 22A includes an electrically conductive material such as a metal material. Examples of the metal material include copper.

Here, the negative electrode active material layer 22B is provided on each of the two opposed surfaces of the negative electrode current collector 22A. The negative electrode active material layer 22B includes one or more of negative electrode active materials into which lithium is insertable and from which lithium is extractable. Note that the negative electrode active material layer 22B may be provided only on one of the two opposed surfaces of the negative electrode current collector 22A on a side where the negative electrode 22 is opposed to the positive electrode 21. Further, the negative electrode active material layer 22B may further include one or more of other materials including, without limitation, a negative electrode binder and a negative electrode conductor. A method of forming the negative electrode active material layer 22B is not particularly limited and specifically includes one or more of methods including, without limitation, a coating method, a vapor-phase method, a liquid-phase method, a thermal spraying method, and a firing (sintering) method.

The negative electrode active material is not particularly limited in kind, and specific examples thereof include a carbon material, a metal-based material, or both. A reason for this is that a high energy density is obtainable. Examples of the carbon material include graphitizable carbon, non-graphitizable carbon, and graphite (natural graphite and artificial graphite). The metal-based material is a material that includes, as a constituent element or constituent elements, one or more elements among metal elements and metalloid elements that are each able to form an alloy with lithium. Specific examples of such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0<x\leq2$ or $0.2<x<1.4$).

Details of the negative electrode binder are similar to those of the positive electrode binder according to an embodiment. Details of the negative electrode conductor are similar to those of the positive electrode conductor according to an embodiment.

As illustrated in FIG. 2, the separator 23 is an insulating porous film interposed between the positive electrode 21 and the negative electrode 22, and allows lithium ions to pass therethrough while preventing contact (a short circuit) between the positive electrode 21 and the negative electrode 22. The separator 23 includes a polymer compound such as polyethylene.

The positive electrode 21, the negative electrode 22, and the separator 23 are each impregnated with the electrolytic solution, and the electrolytic solution has the configuration described above. That is, the electrolytic solution includes the reactive cyclic carbonic acid ester and the anthraquinone compound together.

As illustrated in FIGS. 1 and 2, the positive electrode lead 25 is coupled to the positive electrode current collector 21A of the positive electrode 21. The positive electrode lead 25 includes one or more of electrically conductive materials including, without limitation, aluminum. The positive electrode lead 25 is electrically coupled to the battery cover 14 via the safety valve mechanism 15.

As illustrated in FIGS. 1 and 2, the negative electrode lead 26 is coupled to the negative electrode current collector 22A of the negative electrode 22. The negative electrode lead 26 includes one or more of electrically conductive materials including, without limitation, nickel. The negative electrode lead 26 is electrically coupled to the battery can 11.

Upon charging the secondary battery, in the battery device 20, lithium is extracted from the positive electrode 21, and the extracted lithium is inserted into the negative electrode 22 via the electrolytic solution. Upon discharging the secondary battery, in the battery device 20, lithium is extracted from the negative electrode 22, and the extracted lithium is inserted into the positive electrode 21 via the electrolytic solution. Upon charging and discharging, lithium is inserted and extracted in an ionic state.

In a case of manufacturing the secondary battery, the positive electrode 21 and the negative electrode 22 are fabricated, following which the secondary battery is fabricated using the positive electrode 21, the negative electrode 22, and the electrolytic solution, according to a procedure to be described below. Note that the procedure for preparing the electrolytic solution is as described above.

First, a mixture (a positive electrode mixture) in which the positive electrode active material, the positive electrode binder, and the positive electrode conductor are mixed with each other is put into a solvent to thereby prepare a positive electrode mixture slurry in a paste form. The solvent may be an aqueous solvent, or may be an organic solvent. Thereafter, the positive electrode mixture slurry is applied on the two opposed surfaces of the positive electrode current collector 21A to thereby form the positive electrode active material layers 21B. Thereafter, the positive electrode active material layers 21B may be compression-molded by means of, for example, a roll pressing machine. In this case, the positive electrode active material layers 21B may be heated. The positive electrode active material layers 21B may be compression-molded multiple times. In this manner, the positive electrode active material layers 21B are formed on the respective two opposed surfaces of the positive electrode current collector 21A. Thus, the positive electrode 21 is fabricated.

The negative electrode 22 is formed by a procedure similar to the fabrication procedure of the positive electrode 21 described above. Specifically, first, a mixture (a negative electrode mixture) in which the negative electrode active material, the negative electrode binder, and the negative electrode conductor are mixed with each other is put into a solvent to thereby prepare a negative electrode mixture slurry in a paste form. Thereafter, the negative electrode mixture slurry is applied on the two opposed surfaces of the negative electrode current collector 22A to thereby form the negative electrode active material layers 22B. Thereafter, the negative electrode active material layers 22B may be compression-molded. In this manner, the negative electrode active material layers 22B are formed on the respective two opposed surfaces of the negative electrode current collector 22A. Thus, the negative electrode 22 is fabricated.

First, the positive electrode lead 25 is coupled to the positive electrode current collector 21A of the positive electrode 21 by a method such as a welding method, and the negative electrode lead 26 is coupled to the negative electrode current collector 22A of the negative electrode 22 by a method such as a welding method. Thereafter, the positive electrode 21 and the negative electrode 22 are stacked on each other with the separator 23 interposed therebetween, following which the stack of the positive electrode 21, the negative electrode 22, and the separator 23 is wound to thereby form a wound body (not illustrated) having the winding space 20C. The wound body has a configuration similar to that of the battery device 20 except that the positive electrode 21, the negative electrode 22, and the separator 23 are each not impregnated with the electrolytic solution. Thereafter, the center pin 24 is disposed in the winding space 20C of the wound body.

Thereafter, with the wound body interposed between the insulating plates 12 and 13, the wound body is placed inside the battery can 11 having the open end part together with the insulating plates 12 and 13. In this case, the positive electrode lead 25 is coupled to the safety valve mechanism 15 by a method such as a welding method, and the negative electrode lead 26 is coupled to the battery can 11 by a method such as a welding method. Thereafter, the electrolytic solution is injected into the battery can 11 to thereby impregnate the wound body with the electrolytic solution. The positive electrode 21, the negative electrode 22, and the separator 23 are thereby each impregnated with the electrolytic solution. The battery device 20 is thus fabricated.

Lastly, the battery cover 14, the safety valve mechanism 15, and the PTC device 16 are placed inside the battery can 11 having the open end part. Thereafter, the open end part of the battery can 11 is crimped by means of the gasket 17. In this manner, the battery cover 14, the safety valve mechanism 15, and the PTC device 16 are secured to the open end part of the battery can 11, and the battery device 20 is sealed inside the battery can 11. As a result, the secondary battery is assembled.

The secondary battery after being assembled is charged and discharged. Various conditions including, for example, an environmental temperature, the number of times of charging and discharging (the number of cycles), and charging and discharging conditions may be set as desired. In this manner, a film is formed on the surface of each of the positive electrode 21 and the negative electrode 22, and the state of the secondary battery is electrochemically stabilized. In this case, as described above, owing to synergistic interaction between the reactive cyclic carbonic acid ester compound and the anthraquinone compound, a favorable film derived from both of the reactive cyclic carbonic acid ester compound and the anthraquinone compound is formed. As a result, the secondary battery is completed.

The secondary battery includes the electrolytic solution having the configuration described above. In this case, a robust film is formed on the surface of each of the positive electrode 21 and the negative electrode 22 for the reason described above, which suppresses the decomposition reaction of the electrolytic solution even upon repeated charging and discharging. It is thus possible to achieve a superior cyclability characteristic.

In particular, the secondary battery may include a lithium-ion secondary battery. This makes it possible to obtain a sufficient battery capacity stably through the use of insertion and extraction of lithium. Accordingly, it is possible to achieve higher effects.

Other action and effects of the secondary battery are similar to those of the electrolytic solution described above.

The configuration of the secondary battery described herein is appropriately modifiable including as described below according to an embodiment. Note that any two or more of the following series of modifications may be combined with each other.

The description has been given of the case where the secondary battery has a battery structure of the cylindrical type. However, although not specifically illustrated here, the battery structure is not particularly limited in kind and may thus be, for example, a laminated-film type, a prismatic type, a coin type, or a button type.

The separator 23, which is a porous film, is used. However, although not specifically illustrated here, a separator of a stacked type including a polymer compound layer may be used.

Specifically, the separator of the stacked type includes a porous film having two opposed surfaces and the polymer compound layer provided on one of or each of the two opposed surfaces of the porous film. A reason for this is that adherence of the separator to each of the positive electrode 21 and the negative electrode 22 improves, which suppresses the occurrence of misalignment (irregular winding) of the battery device 20. This helps to prevent the secondary battery from easily swelling even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that the insulating particles dissipate heat upon heat generation by the secondary battery, thus improving safety or heat resistance of the secondary battery. The insulating particles include an inorganic material, a resin material, or both. Specific examples of the inorganic material include aluminum oxide, aluminum nitride, boehmite, silicon oxide, titanium oxide, magnesium oxide, and zirconium oxide. Specific examples of the resin material include acrylic resin and styrene resin.

In a case of fabricating the separator of the stacked type, a precursor solution including, without limitation, the polymer compound and a solvent is prepared, following which the precursor solution is applied on one of or each of the two opposed surfaces of the porous film. In this case, insulating particles may be added to the precursor solution on an as-needed basis.

In the case where the separator of the stacked type is used also, lithium ions are movable between the positive electrode 21 and the negative electrode 22, and similar effects are therefore obtainable. In this case, particularly, the safety of the secondary battery is improved as described above. Accordingly, it is possible to achieve higher effects. Needless to say, the separator of the stacked type described above is applicable not only to a secondary battery of a cylindrical type but also to a secondary battery of a laminated-film type, for example.

The electrolytic solution, which is a liquid electrolyte, is used. However, although not specifically illustrated here, an electrolyte layer that is a gel electrolyte may be used.

In the battery device 20 including the electrolyte layer, the positive electrode 21 and the negative electrode 22 are stacked on each other with the separator 23 and the electrolyte layer interposed therebetween, and the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound. A reason for this is that liquid leakage of the electrolytic solution is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and a solvent is prepared, following which the precursor solution is applied on one side or both sides of the positive electrode 21 and on one side or both sides of the negative electrode 22.

When the electrolyte layer is used also, lithium ions are movable between the positive electrode 21 and the negative electrode 22 via the electrolyte layer, and similar effects are therefore obtainable. In this case, particularly, the liquid leakage of the electrolytic solution is prevented as described above. Accordingly, it is possible to achieve higher effects. Needless to say, the electrolyte layer described above is applicable not only to a secondary battery of a cylindrical type but also to a secondary battery of a laminated-film type, for example.

Applications (application examples) of the secondary battery are not particularly limited. The secondary battery used as a power source may serve as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems or industrial battery systems for accumulation of electric power for a situation such as emergency. The above-described applications may each use one secondary battery, or may each use multiple secondary batteries.

The battery packs may each include a single battery, or may each include an assembled battery. The electric vehicle is a vehicle that operates (travels) using the secondary battery as a driving power source, and may be a hybrid automobile that is additionally provided with a driving source other than the secondary battery. In an electric power storage system for home use, electric power accumulated in the secondary battery which is an electric power storage source may be utilized for using, for example, home appliances.

An application example of the secondary battery will now be described in detail. The configuration of the application example described below is merely an example, and is appropriately modifiable.

Figure 3:
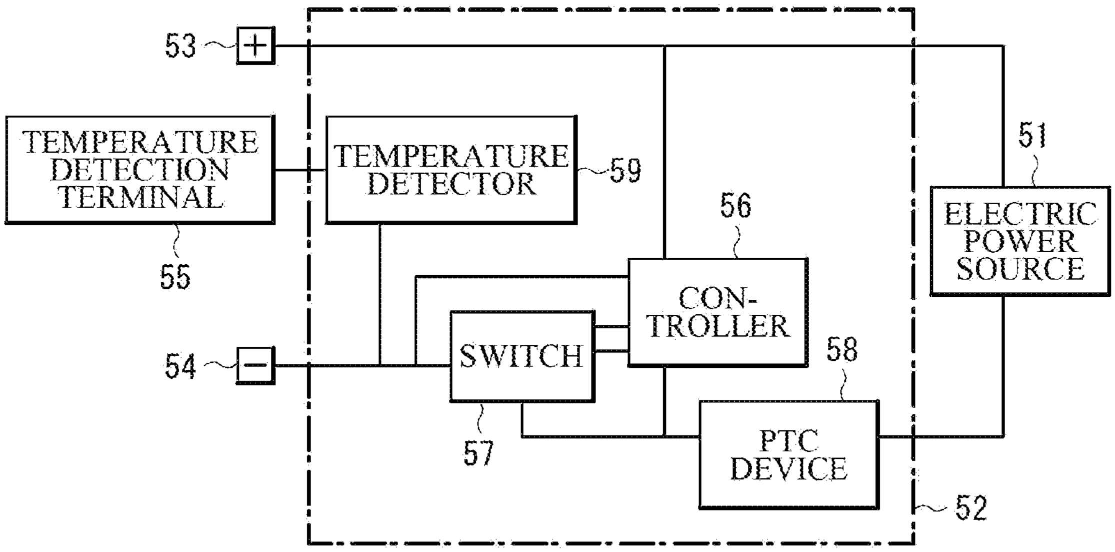
FIG. 3 is a block diagram illustrating a configuration of an application example of the secondary battery.

FIG. 3 illustrates a block configuration of a battery pack. The battery pack described here is a battery pack (what is called a soft pack) including one secondary battery, and is to be mounted on, for example, electronic equipment typified by a smartphone.

As illustrated in FIG. 3, the battery pack includes an electric power source 51 and a circuit board 52. The circuit board 52 is coupled to the electric power source 51 and includes a positive electrode terminal 53, a negative electrode terminal 54, and a temperature detection terminal 55.

The electric power source 51 includes one secondary battery. The secondary battery has a positive electrode lead coupled to the positive electrode terminal 53 and a negative electrode lead coupled to the negative electrode terminal 54. The electric power source 51 is couplable to outside through the positive electrode terminal 53 and the negative electrode terminal 54 and is thus chargeable and dischargeable. The circuit board 52 includes a controller 56, a switch 57, a PTC device 58, and a temperature detector 59. However, the PTC device 58 may be omitted.

The controller 56 includes, for example, a central processing unit (CPU) and a memory and controls an overall operation of the battery pack. The controller 56 detects and controls a use state of the electric power source 51 on an as-needed basis.

If a voltage of the electric power source 51 (the secondary battery) reaches an overcharge detection voltage or an overdischarge detection voltage, the controller 56 turns off the switch 57. This prevents a charging current from flowing into a current path of the electric power source 51. The overcharge detection voltage is not particularly limited and is specifically 4.2 V±0.05 V. The overdischarge detection voltage is not particularly limited and is specifically 2.4 V±0.1 V.

The switch 57 includes, for example, a charge control switch, a discharge control switch, a charging diode, and a discharging diode. The switch 57 performs switching between coupling and decoupling between the electric power source 51 and external equipment in accordance with an instruction from the controller 56. The switch 57 includes, for example, a metal-oxide-semiconductor field-effect transistor (MOSFET). The charging and discharging currents are detected based on an ON-resistance of the switch 57.

The temperature detector 59 includes a temperature detection device such as a thermistor. The temperature detector 59 measures a temperature of the electric power source 51 using the temperature detection terminal 55 and outputs a result of the temperature measurement to the controller 56. The result of the temperature measurement to be obtained by the temperature detector 59 is used, for example, in a case where the controller 56 performs charge and discharge control upon abnormal heat generation or in a case where the controller 56 performs a correction process upon calculating a remaining capacity.

EXAMPLES

A description is given of Examples of the present technology according to an embodiment.

Examples 1-1 to 1-36 and Comparative Examples 1 to 5

Secondary batteries were fabricated, following which the secondary batteries were each evaluated for a battery characteristic as described below.

[Fabrication of Secondary Battery]

The lithium-ion secondary batteries of the cylindrical type illustrated in FIGS. 1 and 2 were fabricated in accordance with the following procedure.

(Fabrication of Positive Electrode)

First, 91 parts by mass of the positive electrode active material ($LiCoO_2$ that was the lithium-containing compound (an oxide)), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into a solvent (N-methyl-2-pyrrolidone that was an organic solvent), following which the solvent was stirred to thereby prepare a positive electrode mixture slurry in a paste form. Thereafter, the positive electrode mixture slurry was applied on the two opposed surfaces of the positive electrode current collector 21A (a band-shaped aluminum foil having a thickness of 12 μm) by means of a coating apparatus, following which the applied positive electrode mixture slurry was dried to thereby form the positive electrode active material layers 21B. Lastly, the positive electrode active material layers 21B were compression-molded by means of a roll pressing machine. The positive electrode 21 was thus fabricated.

(Fabrication of Negative Electrode)

First, 93 parts by mass of the negative electrode active material (artificial graphite that was the carbon material) and 7 parts by mass of the negative electrode binder (polyvinylidene difluoride) were mixed with each other to thereby obtain a negative electrode mixture. Thereafter, the negative electrode mixture was put into a solvent (N-methyl-2-pyrrolidone that was an organic solvent), following which the solvent was stirred to thereby prepare a positive electrode mixture slurry in a paste form. Thereafter, the negative electrode mixture slurry was applied on the two opposed surfaces of the negative electrode current collector 22A (a band-shaped copper foil having a thickness of 15 μm) by means of a coating apparatus, following which the applied negative electrode mixture slurry was dried to thereby form the negative electrode active material layers 22B. Lastly, the negative electrode active material layers 22B were compression-molded by means of a roll pressing machine. The negative electrode 22 was thus fabricated.

(Preparation of Electrolytic Solution)

The electrolyte salt ($LiPF_6$ that was a lithium salt) was added to the solvent, following which the solvent was stirred. Used as the solvent were γ-butyrolactone (GBL) that was the high-dielectric-constant solvent (the lactone), ethylene carbonate (EC) that was the high-dielectric-constant solvent (the cyclic carbonic acid ester), and dimethyl carbonate (DMC) that was the low-dielectric-constant solvent (the chain carbonic acid ester). A mixture ratio (a weight ratio) of the solvent between GBL, EC, and DMC was set to 10:10:80 to thereby set the proportion R (wt %) to 50 wt %. The content of the electrolyte salt was set to 1.2 mol/kg with respect to the solvent. Thereafter, the reactive cyclic carbonic acid ester compound and the anthraquinone compound were added to the solvent to which the electrolyte salt was added, following which the solvent was stirred. In this manner, the electrolytic solution was prepared.

As the reactive cyclic carbonic acid ester compound, each of the unsaturated cyclic carbonic acid ester, the fluorinated cyclic carbonic acid ester, and the cyanated cyclic carbonic acid ester was used. A kind of the reactive cyclic carbonic acid ester compound, a content (wt %) of the reactive cyclic carbonic acid ester compound in the electrolytic solution, a kind of the anthraquinone compound, and a content (wt %) of the anthraquinone compound in the electrolytic solution were as presented in Tables 1 and 2.

In each of Tables 1 and 2, the column of "Classification" indicates the kind of the reactive cyclic carbonic acid ester compound, and the column of "Electron donating group" indicates the presence and absence of an electron donating group regarding the anthraquinone compound. In the column of "Classification", "Unsaturated" means the unsaturated cyclic carbonic acid ester, "Fluorinated" means the fluorinated cyclic carbonic acid ester, and "Cyanated" means the cyanated cyclic carbonic acid ester.

Note that, for comparison, the electrolytic solution was prepared by a similar procedure except that neither the reactive cyclic carbonic acid ester compound nor the anthraquinone compound was used. Further, the electrolytic solution was prepared by a similar procedure except that only one of the reactive cyclic carbonic acid ester compound or the anthraquinone compound was used.

(Assembly of Secondary Battery)

First, the positive electrode lead 25 including aluminum was welded to the positive electrode current collector 21A of the positive electrode 21, and the negative electrode lead 26 including copper was welded to the negative electrode current collector 22A of the negative electrode 22.

Thereafter, the positive electrode 21 and the negative electrode 22 were stacked on each other with the separator 23 (a fine porous polyethylene film having a thickness of 15 μm) interposed therebetween, following which the stack of the positive electrode 21, the negative electrode 22, and the separator 23 was wound to thereby fabricate a wound body including the winding space 20C. Thereafter, the center pin 24 was disposed in the winding space 20C of the wound body.

Thereafter, the insulating plates 12 and 13 were placed inside the battery can 11 having the open end part together with the wound body. In this case, the positive electrode lead 25 was welded to the safety valve mechanism 15, and the negative electrode lead 26 was welded to the battery can 11. Thereafter, the electrolytic solution was injected into the battery can 11. In this manner, the wound body was impregnated with the electrolytic solution. As a result, the battery device 20 was fabricated.

Lastly, the battery cover 14, the safety valve mechanism 15, and the PTC device 16 were placed inside the battery can 11 having the open end part, following which the open end part of the battery can 11 was crimped by means of the gasket 17. Accordingly, the battery can 11 was sealed, and thus the secondary battery was assembled.

(Stabilization of Secondary Battery)

The secondary battery was charged and discharged for one cycle in an ambient temperature environment (at a temperature of 23° C.). Upon charging, the secondary battery was charged with a constant current of 0.1 C until a voltage reached 4.2 V, and was thereafter charged with a constant voltage of 4.2 V until a current reached 0.05 C. Upon discharging, the secondary battery was discharged with a constant current of 0.1 C until the voltage reached 3.0 V. Note that 0.1 C was a value of a current that caused a battery capacity (a theoretical capacity) to be completely discharged in 10 hours, and 0.05 C was a value of a current that caused the battery capacity to be completely discharged in 20 hours. As a result, the lithium-ion secondary battery of the cylindrical type was completed.

[Evaluation of Battery Characteristic]

Evaluation of the secondary batteries for their battery characteristics (cyclability characteristics) revealed the results presented in Tables 1 and 2.

In a case of examining the cyclability characteristic, first, the secondary battery was charged in a high-temperature environment (at a temperature of 50° C.), following which the charged secondary battery was left standing (for a standing time of 3 hours) in the same environment. Upon charging, the secondary battery was charged with a constant current of 1 C until a voltage reached 4.2 V, and was thereafter charged with a constant voltage of 4.2 V until a current reached 0.05 C. Note that 1 C was a value of a current that caused the battery capacity to be completely discharged in 1 hour.

Thereafter, the secondary battery was discharged in the same environment to thereby measure a discharge capacity (a first-cycle discharge capacity). Upon discharging, the secondary battery was discharged with a constant current of 3 C until a voltage reached 3.0 V. Note that 3 C was a value of a current that caused the battery capacity to be completely discharged in 10/3 hours.

Thereafter, the secondary battery was repeatedly charged and discharged in the same environment until the number of cycles reached 100 to thereby measure the discharge capacity (a 100th-cycle discharge capacity). Charging and discharging conditions in and after a second cycle were similar to those in the first cycle.

Lastly, a capacity retention rate that was an index for evaluating the cyclability characteristic was calculated based on the following calculation expression: capacity retention rate (%)=(100th-cycle discharge capacity/first-cycle discharge capacity)×100.

TABLE 1

| | Reactive cyclic carbonic acid ester compound | | | Anthraquinone compound | | | Capacity |
|---|---|---|---|---|---|---|---|
| | Classification | Kind | Content (wt %) | Kind | Electron donating group | Content (wt %) | retention rate (%) |
| Example 1-1 | Unsaturated | VC | 0.1 | MAQ | Present | 0.5 | 80 |
| Example 1-2 | | | 0.5 | | | | 84 |
| Example 1-3 | | | 5 | | | | 85 |
| Example 1-4 | | | 10 | | | | 85 |
| Example 1-5 | | | 15 | | | | 81 |
| Example 1-6 | Fluorinated | FEC | 0.1 | | | | 79 |
| Example 1-7 | | | 0.5 | | | | 84 |
| Example 1-8 | | | 5 | | | | 85 |
| Example 1-9 | | | 10 | | | | 86 |
| Example 1-10 | | | 15 | | | | 80 |
| Example 1-11 | Cyanated | CNEC | 0.1 | | | | 79 |
| Example 1-12 | | | 0.5 | | | | 83 |
| Example 1-13 | | | 5 | | | | 84 |
| Example 1-14 | | | 10 | | | | 84 |
| Example 1-15 | | | 15 | | | | 80 |

TABLE 1-continued

| | Reactive cyclic carbonic acid ester compound | | | Anthraquinone compound | | | |
|---|---|---|---|---|---|---|---|
| | Classification | Kind | Content (wt %) | Kind | Electron donating group | Content (wt %) | Capacity retention rate (%) |
| Example 1-16 | Fluorinated | FEC | 0.5 | MAQ | Present | 0.005 | 76 |
| Example 1-17 | | | | | | 0.01 | 86 |
| Example 1-18 | | | | | | 1 | 82 |
| Example 1-19 | | | | | | 1.5 | 77 |
| Example 1-20 | Unsaturated | VEC | 0.5 | MAQ | Present | 0.5 | 82 |
| Example 1-21 | | MEC | 0.5 | | | | 84 |
| Example 1-22 | Fluorinated | DFEC | 0.5 | | | | 83 |
| Example 1-23 | | FEC + DFEC | 0.25 + 0.25 | | | | 84 |

TABLE 2

| | Reactive cyclic carbonic acid ester compound | | | Anthraquinone compound | | | |
|---|---|---|---|---|---|---|---|
| | Classification | Kind | Content (wt %) | Kind | Electron donating group | Content (wt %) | Capacity retention rate (%) |
| Example 1-24 | Unsaturated and fluorinated | VC + FEC | 0.25 + 0.25 | MAQ | Present | 0.5 | 86 |
| Example 1-25 | Unsaturated and cyanated | FEC + CNEC | 0.25 + 0.25 | | | | 83 |
| Example 1-26 | Cyanated and unsaturated | CNEC + VC | 0.25 + 0.25 | | | | 85 |
| Example 1-27 | Unsaturated | VC | 0.5 | AQ | Absent | 0.5 | 82 |
| Example 1-28 | Fluorinated | FEC | 0.5 | AQ | Absent | 0.5 | 81 |
| Example 1-29 | | | | DMAQ | Present | 0.5 | 86 |
| Example 1-30 | | | | EAQ | Present | 0.5 | 86 |
| Example 1-31 | | | | BAQ | Present | 0.5 | 85 |
| Example 1-32 | | | | VAQ | Present | 0.5 | 83 |
| Example 1-33 | | | | PAQ | Present | 0.5 | 84 |
| Example 1-34 | | | | BZAQ | Present | 0.5 | 84 |
| Example 1-35 | | | | AQSK | Present | 0.5 | 79 |
| Example 1-36 | Cyanated | CNEC | 0.5 | AQ | Absent | 0.5 | 80 |
| Comparative example 1-1 | — | — | — | — | — | — | 55 |
| Comparative example 1-2 | Unsaturated | VC | 0.5 | — | — | — | 65 |
| Comparative example 1-3 | Fluorinated | FEC | 0.5 | — | — | — | 65 |
| Comparative example 1-4 | Cyanated | CNEC | 0.5 | — | — | — | 63 |
| Comparative example 1-5 | — | — | — | MAQ | Present | 0.5 | 60 |

As indicated in Tables 1 and 2, the capacity retention rate varied greatly depending on the composition of the electrolytic solution. In the following, the capacity retention rate in a case where the electrolytic solution included neither the reactive cyclic carbonic acid ester compound nor the anthraquinone compound (Comparative example 1-1) was set as a comparison reference.

In a case where the electrolytic solution included only the reactive cyclic carbonic acid ester compound (Comparative examples 1-2 to 1-4), the capacity retention rate slightly increased. In a case where the electrolytic solution included only the anthraquinone compound (Comparative examples 1-5), the capacity retention rate slightly increased.

More specifically, in the case where the electrolytic solution included only the reactive cyclic carbonic acid ester compound, the capacity retention rate increased by approximately 18%, and in the case where the electrolytic solution included only the anthraquinone compound, the capacity retention rate increased by approximately 9%. Thus, in a case where the electrolytic solution included both the reactive cyclic carbonic acid ester compound and the anthraquinone compound, the capacity retention rate was expected to increase by approximately 27% (=18%+9%).

However, in practice, the capacity retention rate increased significantly in the case where the electrolytic solution included both the reactive cyclic carbonic acid ester compound and the anthraquinone compound (Examples 1-1 to 1-36).

More specifically, the capacity retention rate increased by up to approximately 56% in a case where the electrolytic solution included both the reactive cyclic carbonic acid ester compound and the anthraquinone compound. Against the above-described expectation, an increase rate (=approximately 56%) of the capacity retention rate was almost twice as high as the expected value (=approximately 27%). It is considered that a reason why the capacity retention rate increased significantly in the case where both the reactive cyclic carbonic acid ester compound and the anthraquinone compound were used is that the decomposition reaction of the electrolytic solution was markedly suppressed owing to synergistic interaction between the reactive cyclic carbonic acid ester compound and the anthraquinone.

In particular, the following tendencies were achieved when the electrolytic solution included both the reactive cyclic carbonic acid ester compound and the anthraquinone compound. Firstly, the anthraquinone compound that included the electron donating group(s) further increased the capacity retention rate. Secondly, the anthraquinone compound that included the sulfonic acid alkali metal salt group as the acid metal salt group sufficiently increased the capacity retention rate. Thirdly, when the content of the reactive cyclic carbonic acid ester compound in the electrolytic solution was within the range from 0.5 wt % to 10 wt % both inclusive, the capacity retention rate further increased. Fourthly, when the content of the anthraquinone compound in the electrolytic solution was within the range from 0.01 wt % to 1.0 wt % both inclusive, the capacity retention rate further increased.

Examples 2-1 to 2-20

As indicated in Table 3, secondary batteries were fabricated by a procedure similar to the procedure in Examples 1-2, 1-7, and 1-12 except that an additive was included in the electrolytic solution, following which the secondary batteries were each evaluated for a battery characteristic (cyclability characteristic). Here, used as the additive were a sulfonic acid ester, a sulfuric acid ester, a sulfurous acid ester, a dicarboxylic acid anhydride, a disulfonic acid anhydride, and a sulfonic acid carboxylic acid anhydride. A kind of the additive and a content (wt %) of the additive in the electrolytic solution were as presented in Table 3.

Specifically, used as the sulfonic acid ester were 1,3-propane sultone (PS), 1-propene-1,3-sultone (PRS), 1,4-butane sultone (BS1), 2,4-butane sultone (BS2), and methanesulfonic acid propargyl ester (MSP).

Used as the sulfuric acid ester were 1,3,2-dioxathiolane 2,2-dioxide (OTO), 1,3,2-dioxathiane 2,2-dioxide (OTA), and 4-methylsulfonyloxymethyl-2,2-dioxo-1,3,2-dioxathiolane (SOTO).

Used as the sulfurous acid ester were 1,3,2-dioxathiolane 2-oxide (DTO) and 4-methyl-1,3,2-dioxathiolane 2-oxide (MDTO).

Used as the dicarboxylic acid anhydride were 1,4-dioxane-2,6-dione (DOD), succinic anhydride (SA), and glutaric anhydride (GA).

Used as the disulfonic acid anhydride were 1,2-ethanedisulfonic anhydride (ESA), 1,3-propanedidisulfonic anhydride (PSA), and hexafluoro 1,3-propanedisulfonic anhydride (FPSA).

Used as the sulfonic acid carboxylic acid anhydride were 2-sulfobenzoic anhydride (SBA) and 2,2-dioxooxathiolane-5-one (DOTO).

TABLE 3

| | Reactive cyclic carbonic acid ester compound Kind | Anthraquinone compound Kind | Additive | | | Capacity retention rate (%) |
|---|---|---|---|---|---|---|
| | | | Classification | Kind | Content (wt %) | |
| Example 2-1 | FEC | MAQ | Sulfonic acid ester | PS | 1 | 92 |
| Example 2-2 | | | | PRS | 1 | 91 |
| Example 2-3 | | | | BS1 | 1 | 89 |
| Example 2-4 | | | | BS2 | 1 | 88 |
| Example 2-5 | | | | MSP | 1 | 90 |
| Example 2-6 | | | Sulfuric acid ester | OTO | 1 | 89 |
| Example 2-7 | | | | OTA | 1 | 89 |
| Example 2-8 | | | | SOTO | 1 | 88 |
| Example 2-9 | | | Sulfurous acid ester | DTO | 1 | 89 |
| Example 2-10 | | | | MDTO | 1 | 90 |
| Example 2-11 | | | Dicarboxylic acid anhydride | DOD | 1 | 88 |
| Example 2-12 | | | | SA | 1 | 89 |
| Example 2-13 | | | | GA | 1 | 90 |

TABLE 3-continued

| | Reactive cyclic carbonic acid ester compound Kind | Anthraquinone compound Kind | Additive Classification | Kind | Content (wt %) | Capacity retention rate (%) |
|---|---|---|---|---|---|---|
| Example 2-14 | | | Disulfonic acid anhydride | ESA | 1 | 92 |
| Example 2-15 | | | | PSA | 1 | 93 |
| Example 2-16 | | | | FPSA | 1 | 91 |
| Example 2-17 | | | Sulfonic acid carboxylic acid anhydride | SBA | 1 | 91 |
| Example 2-18 | | | | DOTO | 1 | 90 |
| Example 2-19 | VC | MAQ | Sulfonic acid ester | PS | 1 | 93 |
| Example 2-20 | CNEC | MAQ | | PS | 1 | 91 |

As indicated in Table 3, the capacity retention rate further increased in a case where the electrolytic solution included any of the sulfonic acid ester, the sulfuric acid ester, the sulfurous acid ester, the dicarboxylic acid anhydride, the disulfonic acid anhydride, and the sulfonic acid carboxylic acid anhydride (Examples 2-1 to 2-20).

Examples 3-1 to 3-20

As indicated in Table 4, secondary batteries were fabricated by a procedure similar to the procedure in Examples 1-2, 1-7, and 1-12 except that the nitrile compound was included as the additive in the electrolytic solution, following which the secondary batteries were each evaluated for a battery characteristic (cyclability characteristic and safety).

A kind of the nitrile compound and a content (wt %) of the nitrile compound in the electrolytic solution were as presented in Table 4. Used as the nitrile compound were octanenitrile (ON), benzonitrile (BN), phthalonitrile (PN), succinonitrile (SN), glutaronitrile (GN), adiponitrile (AN), cebaconitrile (SBN), 1,3,6-hexanetricarbonitrile (HCN), 3,3'-oxydipropionitrile (OPN), 3-butoxypropionitrile (BPN), ethylene glycol bispropionitrile ether (EGPN), 1,2,2,3-tetracyanopropane (TCP), tetracyanoethylene (TCE), fumaronitrile (FN), 7,7,8,8-tetracyanoquinodimethane (TCQ), cyclopentanecarbonitrile (CPCN), 1,3,5-cyclohexanetricarbonitrile (CHCN), and 1,3-bis(dicyanomethylidene)indane (BCMI).

Here, as described above, the safety was evaluated as the battery characteristic in addition to the cyclability characteristic. In a case of examining the safety, the secondary battery was stored in a high-temperature environment (at a temperature of 80° C.), followed by measuring a time (operation time) required for the safety valve mechanism 15 to operate due to an increase in an internal pressure of the battery can 11. The operation time was an index for evaluating the safety (gas generation characteristic), or a parameter representing what is called a gas generation suppression degree. That is, the longer the operation time, the longer the time required for the safety valve mechanism 15 to operate. The longer operation time meant that the generation of gas due to the decomposition reaction of the electrolytic solution inside the battery can 11 was suppressed. Note that the values of the operation time given in Table 4 are values normalized with respect to the operation time measured in Example 1-8 assumed as 1.0.

Here, an increase in the internal pressure of the battery can 11 indicated that the decomposition reaction of the electrolytic solution occurred inside the battery can 11, and thus gas was generated due to the decomposition reaction of the electrolytic solution. Further, the operation of the safety valve mechanism 15 indicated that an electric coupling between the battery cover 14 and the battery device 20 was disconnected.

TABLE 4

| | Reactive cyclic carbonic acid ester compound Kind | Anthraquinone compound Kind | Additive Classification | Kind | Content (wt %) | Capacity retention rate (%) | Operation time (normalized) |
|---|---|---|---|---|---|---|---|
| Example 3-1 | FEC | MAQ | Nitrile compound | ON | 0.5 | 85 | 1.2 |
| Example 3-2 | | | | BN | 0.5 | 84 | 1.1 |
| Example 3-3 | | | | PN | 0.5 | 84 | 1.1 |
| Example 3-4 | | | | SN | 0.5 | 83 | 1.5 |
| Example 3-5 | | | | GN | 0.5 | 82 | 1.4 |

TABLE 4-continued

| | Reactive cyclic carbonic acid ester compound Kind | Anthraquinone compound Kind | Additive Classification | Kind | Content (wt %) | Capacity retention rate (%) | Operation time (normalized) |
|---|---|---|---|---|---|---|---|
| Example 3-6 | | | | AN | 0.5 | 83 | 1.5 |
| Example 3-7 | | | | SBN | 0.5 | 85 | 1.3 |
| Example 3-8 | | | | HCN | 0.5 | 85 | 1.5 |
| Example 3-9 | | | | OPN | 0.5 | 83 | 1.2 |
| Example 3-10 | | | | BPN | 0.5 | 82 | 1.1 |
| Example 3-11 | | | | EGPN | 0.5 | 85 | 1.5 |
| Example 3-12 | | | | TCP | 0.5 | 85 | 1.5 |
| Example 3-13 | | | | TCE | 0.5 | 81 | 1.1 |
| Example 3-14 | | | | FN | 0.5 | 81 | 1.5 |
| Example 3-15 | | | | TCQ | 0.5 | 84 | 1.1 |
| Example 3-16 | | | | CPCN | 0.5 | 84 | 1.2 |
| Example 3-17 | | | | CHCN | 0.5 | 85 | 1.1 |
| Example 3-18 | | | | BCMI | 0.5 | 83 | 1.1 |
| Example 3-19 | VC | MAQ | Nitrile compound | ON | 0.5 | 86 | 1.25 |
| Example 3-20 | CNEC | MAQ | | ON | 0.5 | 84 | 1.3 |

As indicated in Table 4, in a case where the electrolytic solution included the nitrile compound (Examples 3-1 to 3-20), the operation time increased while a high capacity retention rate was maintained.

Examples 4-1 to 4-15

As indicated in Table 5, secondary batteries were fabricated by a similar procedure except that the composition of the solvent was varied, following which the secondary batteries were each evaluated for a battery characteristic (cyclability characteristic and safety).

A kind of the solvent, a mixture ratio (content (wt %)) of the solvent, and a proportion R (wt %) were as presented in Table 5. Here, additionally used were: propylene carbonate (PC) that was the high-dielectric-constant solvent (cyclic carbonic acid ester); each of ethylmethyl carbonate (EMC) and diethyl carbonate (DEC) that were the low-dielectric-constant solvents (chain carbonic acid esters); and propyl propionate (PrPr) that was the low-dielectric-constant solvent (chain carboxylic acid ester). In this case, the kind of the solvent and the mixture ratio of the solvent were each varied to thereby vary the proportion R.

TABLE 5

| | Lactone | | Cyclic carbonic acid ester | | Chain carbonic acid ester | | Chain carboxylic acid ester | | | Capacity | Operation |
|---|---|---|---|---|---|---|---|---|---|---|---|
| | Kind | Content (wt %) | Kind | Content (wt %) | Kind | Content (wt %) | Kind | Content (wt %) | Proportion R (wt %) | retention rate (%) | time (normalized) |
| Example 1-7 | GBL | 10 | EC | 10 | DMC | 80 | — | — | 50 | 85 | 1.25 |
| Example 4-1 | — | — | EC | 20 | DMC | 80 | — | — | 0 | 87 | 1.00 |
| Example 4-2 | GBL | 4 | EC | 16 | DMC | 80 | — | — | 20 | 86 | 1.05 |
| Example 4-3 | GBL | 6 | EC | 14 | DMC | 80 | — | — | 30 | 86 | 1.20 |
| Example 4-4 | GBL | 20 | — | — | DMC | 80 | — | — | 100 | 85 | 1.80 |
| Example 4-5 | GBL | 15 | EC | 15 | EMC + DEC | 35 + 35 | — | — | 50 | 85 | 1.50 |
| Example 4-6 | GBL | 15 | EC | 15 | DEC | 35 | PrPr | 35 | 50 | 85 | 1.60 |

TABLE 5-continued

| | Lactone | | Cyclic carbonic acid ester | | Chain carbonic acid ester | | Chain carboxylic acid ester | | | Capacity | Operation |
|---|---|---|---|---|---|---|---|---|---|---|---|
| | Kind | Content (wt %) | Kind | Content (wt %) | Kind | Content (wt %) | Kind | Content (wt %) | Proportion R (wt %) | retention rate (%) | time (normalized) |
| Example 4-7 | — | — | EC | 30 | EMC + DEC | 35 + 35 | — | — | 0 | 87 | 1.05 |
| Example 4-8 | GBL | 6 | EC | 24 | EMC + DEC | 35 + 35 | — | — | 20 | 86 | 1.08 |
| Example 4-9 | GBL | 9 | EC | 21 | EMC + DEC | 35 + 35 | — | — | 30 | 85 | 1.25 |
| Example 4-10 | GBL | 30 | — | — | EMC + DEC | 35 + 35 | — | — | 100 | 84 | 1.80 |
| Example 4-11 | GBL | 40 | — | — | EMC + DEC | 20 + 20 | PrPr | 20 | 100 | 83 | 1.80 |
| Example 4-12 | — | — | EC + PC | 20 + 20 | EMC + DEC | 20 + 20 | PrPr | 20 | 0 | 84 | 1.08 |
| Example 4-13 | GBL | 20 | EC + PC | 10 + 10 | EMC + DEC | 20 + 20 | PrPr | 20 | 50 | 86 | 1.60 |
| Example 4-14 | — | — | EC + PC | 50 + 50 | — | — | — | — | 0 | 85 | 1.08 |
| Example 4-15 | GBL | 100 | — | — | — | — | — | — | 100 | 85 | 2.00 |

As indicated in Table 5, even when the composition of the solvent was changed (Examples 4-1 to 4-15), a high capacity retention rate was obtained. In this case, particularly, when the electrolytic solution included the high-dielectric-constant solvent (lactone), and the proportion R was within a range from 30% to 100% both inclusive (Example 1-1, etc.), the operation time further increased.

Based upon the results presented in Tables 1 to 5, in the case where the electrolytic solution included the reactive cyclic carbonic acid ester compound anthraquinone compound, a high capacity retention rate was obtained. The secondary battery therefore achieved a superior cyclability characteristic.

Although the present technology has been described above with reference to one or more embodiments including Examples, the configuration of the present technology is not limited there, and is therefore modifiable in a variety of suitable ways.

The description has been given of the case where the battery device has a device structure of a wound type. However, the device structure of the battery device is not particularly limited. Specifically, the device structure may be, for example, a stacked type in which the electrodes (the positive electrode and the negative electrode) are stacked on each other, or a zigzag folded type in which the electrodes are folded in a zigzag manner, or any other structure.

Further, although the description has been given of the case where the electrode reactant is lithium, the electrode reactant is not particularly limited in kind. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited to those described herein. Accordingly, the present technology may achieve any other effect.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:

a positive electrode;

a negative electrode; and an electrolytic solution, wherein the electrolytic solution includes a reactive cyclic carbonic acid ester compound including at least one of an unsaturated cyclic carbonic acid ester, a fluorinated cyclic carbonic acid ester, or a cyanated cyclic carbonic acid ester, and an anthraquinone compound represented by Formula (1), (1)

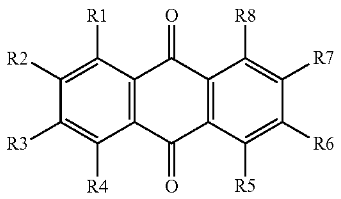

where each of R1 to R8 is independently one of a hydrogen, an alkyl group, an alkenyl group, an aryl group, or an acid metal salt group, and any two or more of RI to R8 are optionally bonded to each other, and at least one of R1 to R8 is an alkyl group, an alkenyl group, an aryl group, or an acid metal salt group.

2. The secondary battery according to claim 1, wherein at least one of R1 to R8 is an acid metal salt group, and the acid metal salt group comprises a sulfonic acid alkali metal salt group.

3. The secondary battery according to claim 1, wherein at least one of R1 to R8 is an electron donating group.

4. The secondary battery according to claim 1, wherein a content of the reactive cyclic carbonic acid ester compound in the electrolytic solution is greater than or equal to 0.5 weight percent and less than or equal to 10 weight percent, and a content of the anthraquinone compound in the electrolytic solution is greater than or equal to 0.01 weight percent and less than or equal to 1 weight percent.

5. The secondary battery according to claim 1, wherein the electrolytic solution includes a high-dielectric-constant solvent having a specific dielectric constant of greater than or equal to 20 at a temperature within a range of higher than or equal to minus 30° C. and lower than 60° C., the high-dielectric-constant solvent includes a lactone, and a proportion of a weight of the lactone to a weight of the high-dielectric-constant solvent is greater than or equal to 30 weight percent to less than or equal to 100 weight percent.

6. The secondary battery according to claim 1, wherein the electrolytic solution further includes at least one of a sulfonic acid ester, a sulfuric acid ester, a sulfurous acid ester, a dicarboxylic acid anhydride, a disulfonic acid anhydride, or a sulfonic acid carboxylic acid anhydride.

7. The secondary battery according to claim 1, wherein the electrolytic solution further includes a nitrile compound.

8. The secondary battery according to claim 1, wherein the secondary battery comprises a lithium-ion secondary battery.

9. An electrolytic solution for a secondary battery, the electrolytic solution comprising:

a reactive cyclic carbonic acid ester compound including at least one of an unsaturated cyclic carbonic acid ester, a fluorinated cyclic carbonic acid ester, or a cyanated cyclic carbonic acid ester; and an anthraquinone compound represented by Formula (1),

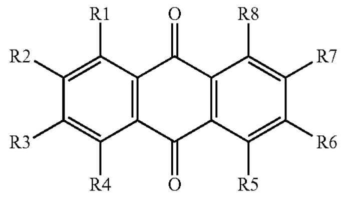

(1)

where each of R1 to R8 is independently one of a hydrogen, an alkyl group, an alkenyl group, an aryl group, or an acid metal salt group, and any two or more of RI to R8 are optionally bonded to each other, and at least one of R1 to R8 is an alkyl group, an alkenyl group, an aryl group, or an acid metal salt group.

10. The secondary battery according to claim 1, wherein the anthraquinone compound is one or more of 2-methylanthraquinone, 2,3-dimethylanthraquinone, 2-ethylanthraquinone, 2-tert-butylanthraquinone, 2-vinylanthraquinone, 2-phenylanthraquinone, 1,2-benzanthraquinone, and dipotassium anthraquinone-1,8-disulfonate.

* * * * *